(12) United States Patent
Smith et al.

(10) Patent No.: US 9,081,379 B2
(45) Date of Patent: Jul. 14, 2015

(54) EVACUATION SYSTEM ALERTS BASED ON PROCESS TOOL SYSTEMS BUS MONITORING

(75) Inventors: James Robert Smith, Taunton (GB); Michael Roger Czerniak, Partridge Green (GB); Nigel James Gibbins, Pevensey (GB)

(73) Assignee: Edwards Limited, Crawley, West Sussex (GB)

( * ) Notice: Subject to any disclaimer, the term of this patent is extended or adjusted under 35 U.S.C. 154(b) by 0 days.

(21) Appl. No.: 13/495,350

(22) Filed: Jun. 13, 2012

(65) Prior Publication Data

US 2012/0253500 A1    Oct. 4, 2012

Related U.S. Application Data

(63) Continuation of application No. 11/628,897, filed as application No. PCT/GB2005/001993 on Jun. 3, 2005, now Pat. No. 8,224,474.

(30) Foreign Application Priority Data

Jun. 7, 2004  (GB) .................................. 0412623.1

(51) Int. Cl.
    *G05B 19/418*    (2006.01)
(52) U.S. Cl.
    CPC .................................. *G05B 19/4185* (2013.01)
(58) Field of Classification Search
    CPC .................... G05B 19/4185; G05B 19/41815; G05B 19/4183; G05B 19/81855; F04B 49/06; F04B 49/065
    USPC .................... 700/9, 95, 121, 266, 281, 282
    See application file for complete search history.

(56) References Cited

U.S. PATENT DOCUMENTS

| 6,101,419 A | 8/2000 | Kennedy et al. |
| 6,272,400 B1 | 8/2001 | Jankins et al. |

(Continued)

FOREIGN PATENT DOCUMENTS

| CN | 1254611 A | 5/2000 |
| CN | 1377056 A | 10/2002 |

(Continued)

OTHER PUBLICATIONS

United Kingdom Search Report of Application No. GB0412623.1 mailed Nov. 10, 2004; claims searched: 1-12; Date of search: Nov. 9, 2004.

(Continued)

*Primary Examiner* — Mohammad Ali
*Assistant Examiner* — Nathan Laughlin
(74) *Attorney, Agent, or Firm* — Westman, Champlin & Koehler, P.A.

(57) ABSTRACT

In a method of controlling operation of a processing system, a host computer, a process tool and a component of an evacuation system, for example an abatement tool, are connected to a system bus. The abatement tool monitors signals transmitted on the system bus between the host computer and the process tool, and signals received directly from the process tool. The abatement tool uses information contained within the monitored signals to generate a signal for the process tool regarding an operating characteristic of the abatement tool. This signal is transmitted either directly or over the system bus to the process tool, which uses the generated signal to control an operating state of the process tool.

4 Claims, 7 Drawing Sheets

(56) References Cited

U.S. PATENT DOCUMENTS

| | | | |
|---|---|---|---|
| 6,739,840 B2 | 5/2004 | Curry et al. | |
| 6,865,513 B2 * | 3/2005 | Ushiku et al. | 702/184 |
| 6,937,963 B2 | 8/2005 | Ishii et al. | |
| 6,985,787 B2 | 1/2006 | Klekotka | |
| 7,172,918 B2 | 2/2007 | Arno | |
| 2001/0041076 A1 | 11/2001 | Ogata et al. | |
| 2001/0045420 A1 * | 11/2001 | Bong et al. | 219/125.1 |
| 2003/0079550 A1 | 5/2003 | Lin et al. | |
| 2003/0219342 A1 | 11/2003 | Curry et al. | |
| 2004/0121494 A1 | 6/2004 | Arno | |
| 2005/0034767 A1 | 2/2005 | Reimer et al. | |
| 2005/0147509 A1 | 7/2005 | Bailey et al. | |
| 2006/0183299 A1 | 8/2006 | Liebeskind | |
| 2006/0259198 A1 * | 11/2006 | Brcka et al. | 700/246 |
| 2007/0251452 A1 | 11/2007 | Tanaka et al. | |

FOREIGN PATENT DOCUMENTS

| | | |
|---|---|---|
| EP | 0822473 A2 | 4/1998 |
| EP | 2264558 A2 | 12/2010 |
| JP | 63066933 A | 3/1988 |
| JP | 2000283056 A | 10/2000 |
| JP | 2001007030 A | 1/2001 |
| JP | 2001129383 A | 5/2001 |
| JP | 2003076414 A | 3/2003 |
| WO | 2004011810 A1 | 2/2004 |

OTHER PUBLICATIONS

PCT Notification of Transmittal of the International Search Report and the Written Opinion of the International Searching Authority, or the Declaration of International Application No. PCT/GB2005/001993; date of mailing: Sep. 30, 2005.

PCT International Search Report of International Application No. PCT/GB2005/001993; date of mailing of the International Search Report: Sep. 30, 2005.

PCT Written Opinion of the International Searching Authority of International Application No. PCT/GB2005/001993; date of mailing: Sep. 30, 2005.

Prosecution history of corresponding U.S. Appl. No. 11/628,897 including: Notice of Allowance and Fees Due dated Mar. 20, 2012; Applicant-Initiated Interview Summary dated Jan. 19, 2012; Amendment filed Jan. 10, 2009; Office Action mailed Aug. 10, 2011; Amendment Under CFR 1.114 dated Aug. 9, 2010; Final Office Action dated May 12, 2010; Amendment filed Nov. 4, 2009; Office Action mailed Aug. 6, 2009; Amendment filed Apr. 23, 2009; Office Action mailed Nov. 24, 2008.

Prosecution history of corresponding Chinese Application No. 200580018296.9 including: First Office Action dated Mar. 7, 2008; Response dated Sep. 12, 2008; Second Office Action dated Nov. 14, 2008; Response dated Dec. 28, 2008.

Prosecution history of corresponding European Application No. 05744277.4 including: Office Action date Mar. 9, 2007; Response dated Jul. 9, 2007; Office Action dated Feb. 18, 2008; Response dated Jun. 12, 2008; Office Action dated Sep. 2, 2009; Response dated Nov. 26, 2009; Office Action dated Mar. 3, 2010; Response dated Sep. 2, 2010; Office Action dated Oct. 28, 2010.

Prosecution history of corresponding European Application No. 10184308.4 including: Office Action and Search Report dated Feb. 16, 2012; Office Action and Search Report dated Nov. 19, 2010.

Prosecution history of corresponding Japanese Application No. 2007-526529 including: Notification of Reason for Rejection dated Dec. 5, 2011; Final Notification of Reason(s) for Rejection dated May 1, 2012; Response dated Apr. 17, 2013; Decision for Dismissal of Amendment dated Dec. 17, 2012; Certified Copy of Decision of Rejection dated Dec. 17, 2012; Inquiry from the Appeal Board dated Jun. 14, 2013; Examination Report by Examiner dated May 10, 2013.

Prosecution history of corresponding Korean Application No. 2006-7025732 including: Reasons for Rejection dated Oct. 2011.

Prosecution history of corresponding Korean Application No. 2012-7005856 including: Reasons for Rejection dated Jun. 2012.

Prosecution documents from corresponding Japanese Application No. JP2012-05157 including: Notification of Reasons for Rejection dated Sep. 30, 2013; Response to Appeal dated Nov. 11, 2013.

Final Notification of Reason(s) for Rejection dated Jul. 9, 2014 for corresponding Japanese Application No. 2012-085157.

\* cited by examiner

EVACUATION SYSTEM ALERTS BASED ON PROCESS TOOL SYSTEMS BUS MONITORING

CROSS-REFERENCES TO RELATED APPLICATIONS

This is a continuation application of application Ser. No. 11/628,897, filed Dec. 6, 2006 now U.S. Pat. No. 8,224,474, which claims the benefits of International Application No. PCT/GB2005/001993, filed Jun. 3, 2005, and foreign Application No. 0412623.1, filed on Jun. 7, 2004 in the UK.

BACKGROUND OF THE INVENTION

The present invention relates to a method of controlling operation of a processing system, for example a semiconductor or flat panel display processing system, and to a computer readable medium containing a program which, when executed, performs an operation for controlling such a semiconductor processing system.

Semiconductor substrate and flat panel display device processing is generally performed within an evacuated process chamber. Evacuation systems for the process chamber typically include a number of vacuum pumps and, depending on the nature of the process gases, a number of abatement tools. It is known, for example, from U.S. Pat. No. 6,739,840 to use parameters such of the gas load on a variable speed vacuum pump to control the speed of the pump, and thereby reduce power consumption.

BRIEF SUMMARY OF THE INVENTION

It is an aim of at least the preferred embodiments of the present invention to provide an improved method of controlling operation of a processing system.

In one aspect, the present invention provides a method of controlling operation of a processing system, for example, a semiconductor processing system, comprising a process tool and an evacuation system for a chamber of the process tool, the method comprising monitoring signals transmitted from the process tool, utilising information contained within the monitored signals to generate a signal containing information for the process tool regarding an operating characteristic or status of a component of the evacuation system, and transmitting the generated signal.

In another aspect, the present invention provides a computer readable medium containing a program which, when executed, performs an operation for controlling a processing system comprising a process tool and an evacuation system for the process tool, the operation comprising monitoring signals transmitted from the process tool, utilising information contained within the monitored signals to generate a signal containing information for the process tool regarding an operating characteristic or status of a component of the evacuation system, and transmitting the generated signal.

The computer program can be contained on a variety of signal-bearing media, for example a read-only memory device or a floppy disk, and may be conveyed to a computer by a communications medium, such as through a computer or telephone network, including wireless communications.

The present invention further provides an evacuation system for a processing system comprising a process tool, wherein at least one of the components of the evacuation system, for example, a vacuum pump and/or an abatement tool, comprises means for monitoring signals transmitted from the process tool, means for utilising information contained within the monitored signals to generate a signal containing information for the process tool regarding an operating characteristic or status of that component, and means for transmitting the generated signal.

The present invention further provides a method of controlling operation of a processing system; said processing system comprising a process tool having a process chamber, and an evacuation system comprising a vacuum pump arranged to evacuate the process chamber and/or an abatement tool for treating effluent stream exhaust from the process chamber, the method comprising: receiving signals indicative of the status of the process tool, said signals being generated by a process controller of the process tool; monitoring the status of the process tool from the received signals; and adjusting an operating characteristics of the evacuation system in response to the received signals.

The process tool can be connected to a system bus, the monitored signals being transmitted between the process tool and a host computer over the system bus.

A controller of the evacuation system can be configured to monitor the signals transmitted between the process tool and the host computer.

The method can be used for generating a signal containing information for the process tool regarding an operating characteristic or status of a component of the evacuation system, and transmitting the generated signal to the host computer, which conveys to the process tool information contained within the generated signal.

The process tool can be arranged to utilise information within the generated signal to control an operating characteristic or status of the process tool.

The present invention further provides a method of controlling operation of a processing system; said processing system comprising a process tool having a process chamber, and an evacuating system comprising a controller for controlling a vacuum pump arranged to evacuate the process chamber and/or an abatement tool for treating effluent stream exhaust from the process chamber, the method comprising: receiving at the controller signals indicative of the current and near-term status of the process tool, said signals being generated by a process controller of the process tool; and allowing the evacuating system to go into low-utility-consumption modes when not required by the process tool.

The present invention further provides a method of controlling operation of a semiconductor processing system; said processing system comprising; a process tool having a process chamber for processing wafers, said process chamber having a load-lock; and an evacuating system comprising a controller for controlling a vacuum pump arranged to evacuate the process chamber and/or an abatement tool for treating effluent stream exhaust from the process chamber: the method comprising: receiving at the controller signals indicative of the number of wafers in the load-lock; and allowing the evacuating system to go into low-utility-consumption modes when there are no wafers in the load-lock and returning to a full operational mode in advance of wafers being processed. In addition, the evacuating system can be returned to a full operational mode as soon as there is activity in the load-lock.

The present invention further provides a method of controlling operation of a semiconductor wafer processing system; said processing system comprising a process tool having a process chamber, and an evacuation system comprising a vacuum pump arranged to evacuate the process chamber and/ or an abatement tool for treating effluent stream exhaust from the process chamber, the method comprising: monitoring signals transmitted from the process tool; utilising information contained within the monitored signals to generate a signal containing information for the process tool regarding an operating characteristic or status of a component of the evacuation system; transmitting the generated signal; and controlling the operational state of the of the process tool in dependence on the generated signal.

Furthermore, the invention can be used for generating an alert from a component of the evacuating system warning that the component is to be shutdown for replacement or service; receiving the alert at a process controller; determining whether the process tool is processing wafers; and if the process tool is not processing wafers, performing a shutdown of the process tool. Also, when the alert is received from the vacuum pump, and if the process tool is processing wafers, then the method can be used for determining whether to shut down the process tool based on process time remaining.

The present invention further provides a method of controlling operation of a processing system; said processing system comprising a process tool having a process chamber, and an evacuating system comprising a vacuum pump arranged to evacuate the process chamber and/or an abatement tool for treating effluent stream exhaust from the process chamber, the method comprising:
monitoring signals transmitted from the process tool;
utilising information contained within the monitored signals to generate a signal;
utilising the signal containing information for the process tool regarding an operating characteristic or status of a component of the evacuation system to enable maintenance of the process tool to be synchronised with maintenance and/or replacement of a component of the evacuating system.

The present invention further provides an evacuation system for a processing system comprising a process tool having a process chamber,
said evacuation system comprising a vacuum pump arranged to evacuate the process chamber and/or an abatement tool for treating effluent stream exhaust from the process chamber, and at least one of the evacuation system components comprises means for monitoring signals transmitted from the process tool,
means for utilising information contained within the monitored signals to generate a signal containing information for the process tool regarding an operating characteristic or status of that component, and means for transmitting the generated signal.

The monitoring means can be configured to monitor signals being transmitted between the process tool and a host computer over a system bus connected to the process tool. The signal transmitting means can be configured to transmit the signal to the host computer.

The present invention also provides a semiconductor processing system comprising an evacuation system as aforementioned.

BRIEF DESCRIPTION OF THE SEVERAL VIEWS OF THE DRAWINGS

Preferred features of the present invention will now be described, by way of example only, with reference to the accompanying figures, in which.

DETAILED DESCRIPTION OF THE INVENTION

With reference to FIGS. 1 to 5, a network 10 of a processing system comprises a processing tool 12. The tool 12 comprises a process chamber 14 for receiving a substrate to be processed. The process chamber 14 may be any type of chamber used for semiconductor processing and which is at least temporarily under vacuum conditions. For example, process chamber 14 may be one of an etch chamber, vapour deposition chamber, ion implantation chamber, transfer chamber, load lock chamber, orientation chamber or the like.

Figure 1:
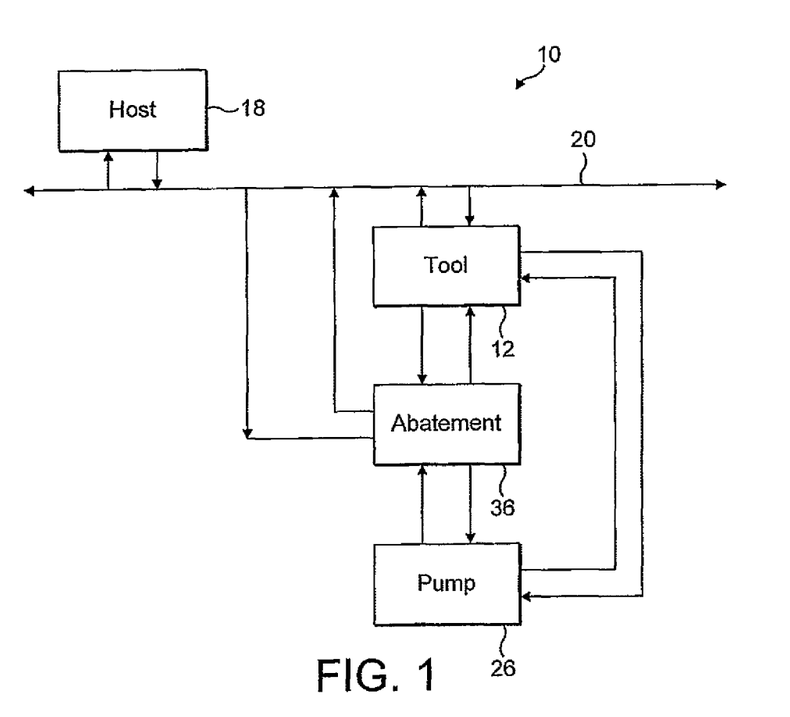
FIG. 1 is a block diagram of an embodiment of a semiconductor fabrication system network.

The tool 12 typically includes a variety of mechanical components, such as control valves, actuators, and motors. For example, the tool 12 may include a number of valves for controlling the supply of gases to the chamber 14 from one or more sources, and for controlling the exhaust of effluent gases from the chamber 14. A process controller 16 controls the processing within the process chamber 14 by generating control signals for controlling the operation of such mechanical components. The process controller 16 may be any device capable of controlling the operation of the tool 12, and typically includes a central processing unit, support circuits and memory storing one or more programs used to operate the tool 12.

The processing tool 12 is linked to a host computer 18 via a system bus 20. The host 18 controls the tool 12 by sending command signals to the controller 16. The controller 16 uses the instructions received within the signals to operate the tool in accordance with the stored programs. Detectors, sensors or the like located within the tool 12 output signals to the process controller 16 relating to processing parameters, for example, the pressure and temperature within the chamber 14, gas flow rates, the loading condition of the chamber 14, and so on, from which the controller 16 generates status signals to be returned to the host 18. These signals enable the host 18 to monitor the operating condition of the tool 12 in response to the commands. These status signals may include, for example, various alarms, events, parameter updates, triggers and the like. From the information received from these signals, the host 18 generates further command signals to be sent to the controller 16.

The signals are preferably transmitted over the system bus 20 according to a common standard, such as GEM/SECS, which is well known in the semiconductor industry. A GEM/SECS communications interface 22 interfaces between the controller 16 and the host 18.

Figure 2A:
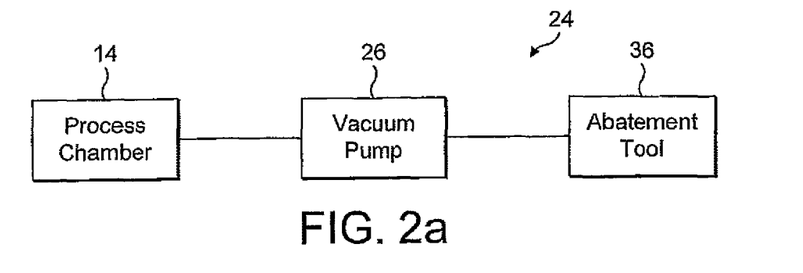
FIGS. 2(a) to 2(c) are block diagrams of different embodiments of an evacuation system for a process chamber.
Figure 2B:
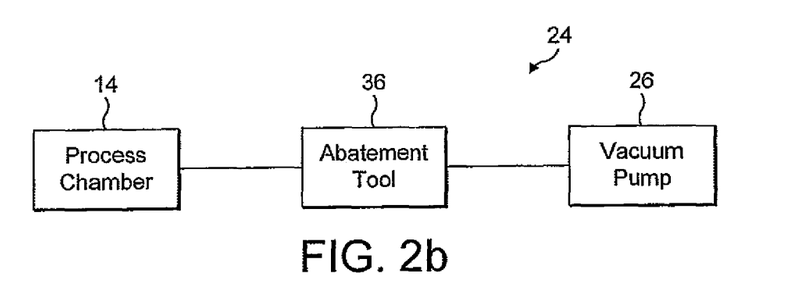
Figure 2C:
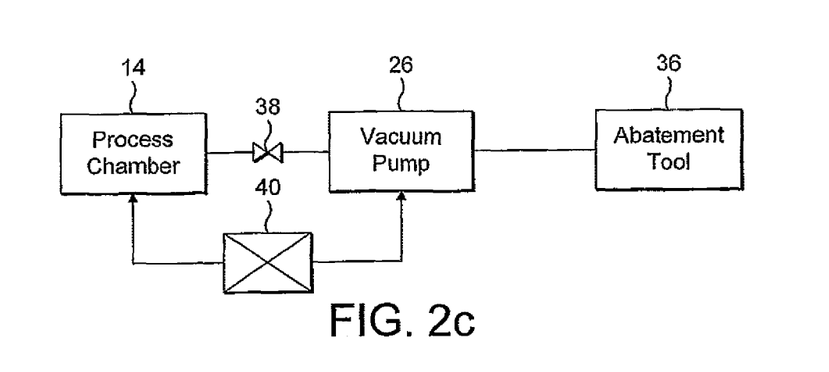

FIGS. 2(a) to 2(c) illustrate in block form various systems for evacuating the process chamber 14. Such evacuation systems 24 typically comprise at least one vacuum pump 26 for evacuating the process chamber 14. The vacuum pump 26 may comprise any suitable type of vacuum pump, for example a single or multi-stage positive displacement pump employing inter-meshing rotors. The rotors may have the same type of profile in each stage or the profile may change from stage to stage. Alternatively, the vacuum pump 26 may comprise a turbomolecular pump, rotary vane pump, cryogenic pump, or positive displacement pump.

Figure 4:
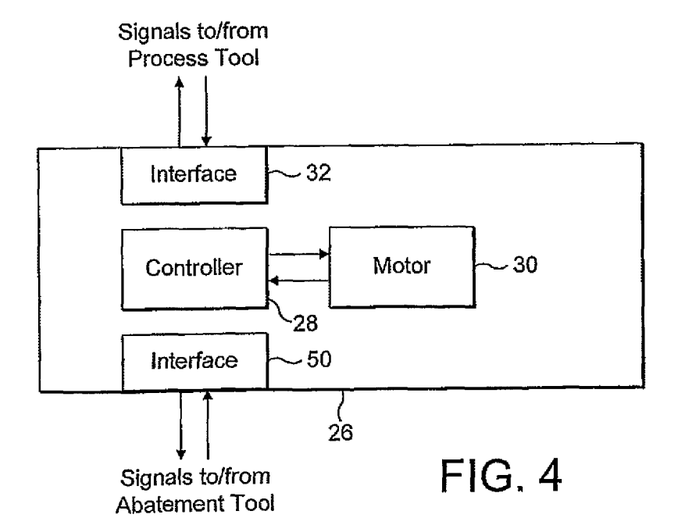
FIG. 4 is a block diagram of a vacuum pump of the network of FIG. 1.

A vacuum pump controller 28 controls the operation of the vacuum pump 26. For example, the controller 28 may be configured to control the pumping speed of the vacuum pump 26 by outputting to a motor 30 for actuating the pumping mechanism signals that control the amount of power drawn by the motor 30. Signals returned to the controller 28 from sensors located at the motor 30 can enable the controller 28 to monitor the status of the motor 30, from which the controller may vary operating parameters such as the frequency of the voltage supplied to the motor 30 to optimise the performance of the pumping mechanism.

Figure 3:
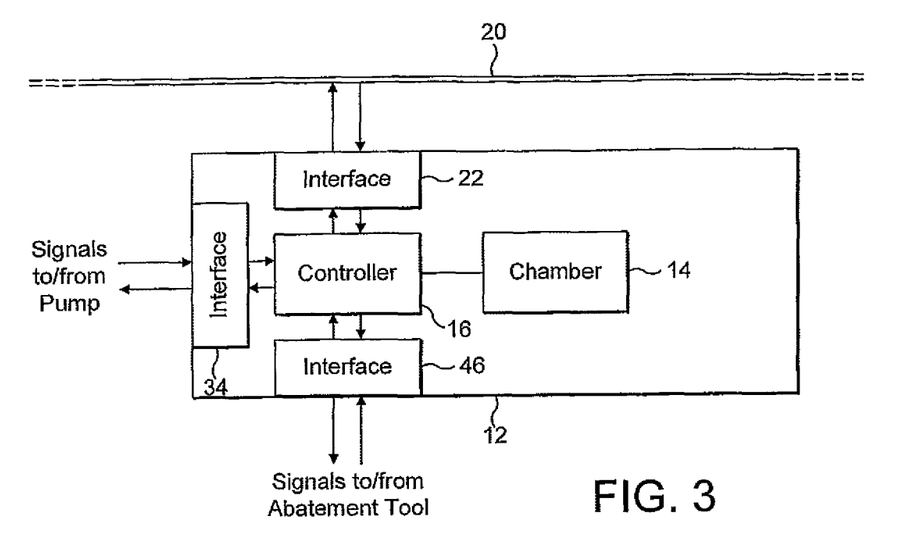
FIG. 3 is a block diagram of a process tool of the network of FIG. 1.

The pump controller 28 may be any device capable of controlling the operation of the vacuum pump 26, and typically includes a central processing unit, support circuits and programmed memory. Control of the operating characteristics of the vacuum pump 26 may be performed in accordance with a pre-programmed routine, and/or in response to external control signals. With reference to FIGS. 1, 3 and 4, in this embodiment the vacuum pump 26 has an interface 32 for receiving, via interface 34, signals generated by the process controller 16 of the process tool 12. These interfaces 32, 34 may be connected together using cables or other physical connectors, or the controllers 16, 28 may be configured for wireless communication. This can enable the interface 32 of the vacuum pump 26 to receive, from the interface 34 of the process tool 12, signals indicative of the status of the process tool 12. The information contained within these signals may be similar to that information contained in the signals transmitted from the process tool 12 to the host 18, for example, information relating to the pressure within the process chamber 14, gas flow rates, and/or the status of one or more valves of the process tool. The controller 28 of the vacuum pump 24 is configured to monitor the status of the process tool 12 from these received signals and to adjust one or more operating characteristics of the vacuum pump, for example the pumping speed, according to a stored algorithm.

The pump controller 28 may also be configured to monitor the operating characteristics of the vacuum pump, such as the temperature within the pump, and to generate alert signals in the event that these operating characteristics exceed predetermined values.

Semiconductor processing techniques typically employ a variety of gases for processes such as thin film deposition, etching, and surface cleaning. Many of these gases, and gases formed as a by-product of these techniques, are toxic, corrosive or combustible. Consequently, the system includes at least one abatement tool 36 for treating the effluent stream exhaust from the process chamber 14 to remove such undesirable gases from the effluent stream. The abatement tool 36 receives the effluent stream from process chamber 14 either downstream from the vacuum pump 26, as shown in FIG. 2(a), or upstream from the vacuum pump 26, as shown in FIG. 2(b), and converts the undesirable gases in the effluent steam either into one or more compounds that can be more conveniently disposed of, for example, by wet scrubbing, and/or into compounds which can be exhaust into the atmosphere. The nature of the abatement tool 36 will depend upon the composition of the effluent gas exhaust from the process chamber 14. For example, the abatement tool 36 may comprise a combustor, such as a thermal process unit (TPU), a pyrophoric conditioning system, a gas reactor column (GRC), a thermal or non-thermal plasma abatement device, or the like.

The evacuation system of the processing system may include other components in addition to vacuum pumps and abatement tools. For example, as shown in FIG. 2(c), the evacuation system may include a purge gas supply 38 for supplying an inert purge gas, such as nitrogen, to the process chamber 14 and the vacuum pump 26, and one or more valves 40 for controlling the flow rate of the effluent gas through the evacuation system. Operation of these components may be controlled either by respective controllers (not shown) or by the controllers of one or more of the process tool 12, vacuum pump 24, and abatement tool 36. Examples of other components of the evacuation system include water-cooled and electrostatic traps for trapping solids contained within the effluent gas.

Figure 5:
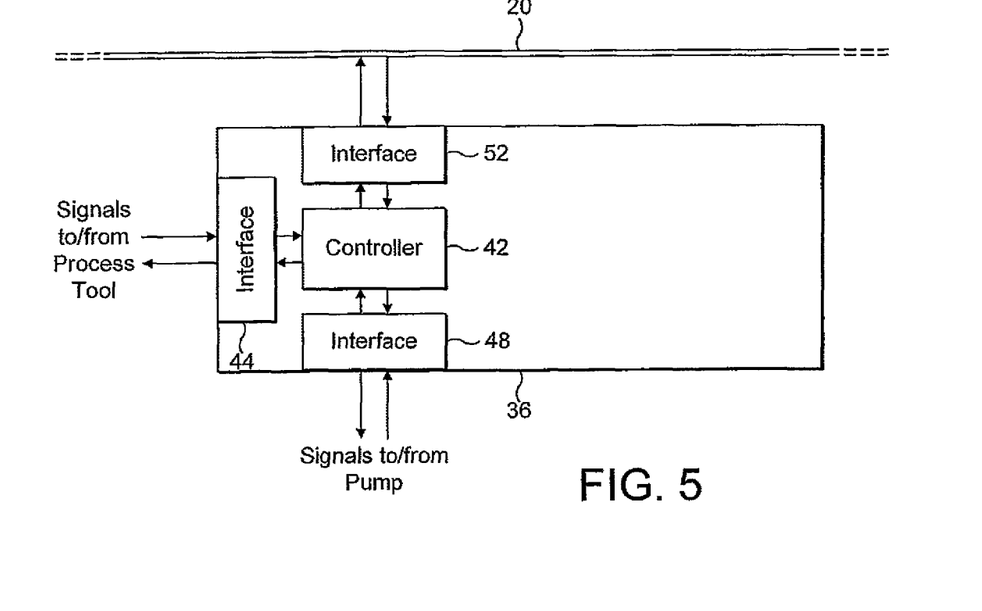
FIG. 5 is a block diagram of an abatement tool of the network of FIG. 1.

An abatement tool controller 42 controls operation of the abatement tool 36. The controller 42 typically controls a power supply to the tool 36, for example to control and adjust a plasma generated in the tool 36, and to switch the tool 36 off and on to enable tool maintenance to be performed. The abatement tool controller 42 may be any device capable of controlling the operation of the abatement tool 36, and typically includes a central processing unit, support circuits and programmed memory. Control of the operating characteristics of the abatement tool 36 may be performed in accordance with a pre-programmed routine, and/or in response to external control signals. With reference to FIGS. 1, 3 and 5, in this embodiment the abatement tool 36 has an interface 44 for receiving, via interface 46, signals generated by the process controller 16 of the process tool 12. These interfaces 44, 46 may be connected together using cables or other physical connectors, or the controllers 16, 42 may be configured for wireless communication. This can enable the interface 44 of the abatement tool 36 to receive, from the interface 46 of the process tool 12, signals indicative of the status of the process tool 12. These signals may be the same as those transmitted from the process tool 12 to the vacuum pump 26. The abatement tool controller 42 is configured to monitor the status of the process tool using these signals received from the process tool 12, and, in response to these signals, adjust an operating characteristic or status of the abatement tool 36 according to a stored algorithm.

With reference to FIGS. 4 and 5, the abatement tool 36 also has an interface 48 which enables the abatement tool controller 42 to receive, via interface 50, signals from the pump controller 28. Again, these interfaces 48, 50 may be connected together using cables or other physical connectors, or the controllers 28, 42 may be configured for wireless communication. This can enable the vacuum pump and abatement tool to monitor the other's operating characteristics.

As shown in FIGS. 1 and 5, the abatement tool controller 42 is further connected to the system bus 20 via interface 52, for example, a GEMS/SECS interface. This interface 52 enables the abatement tool 36 to monitor signals transmitted over the system bus 20 between the process tool 12 and the host 18, the interface 52 being configured to convey the information contained within the monitored signals to the controller 42. As discussed below, interface 52 can also allow (when permitted) the abatement tool 36 to make its own information queries of the process tool 12. In overview, the controllers 28, 42 of the components of evacuation system 24 utilise the information contained within the signals received from other components of the processing system, and, in the case of the abatement tool controller 42, the information contained within the signals transmitted over the system bus 20, to generate control signals, for example for controlling the operation of the vacuum pump 26 and/or the abatement tool 36, or for the generation of status alerts, according to one or more algorithms programmed into the memories of the controllers. This can enable the operational state of the evacuation system 24 to be controlled not only in dependence on operating characteristics of the components of the evacuation system, but also in dependence on status, operating characteristics and/or requirements of the process tool 12.

A first example is illustrated with reference to FIG. 6 in relation to vacuum pump control.

Figure 6A:
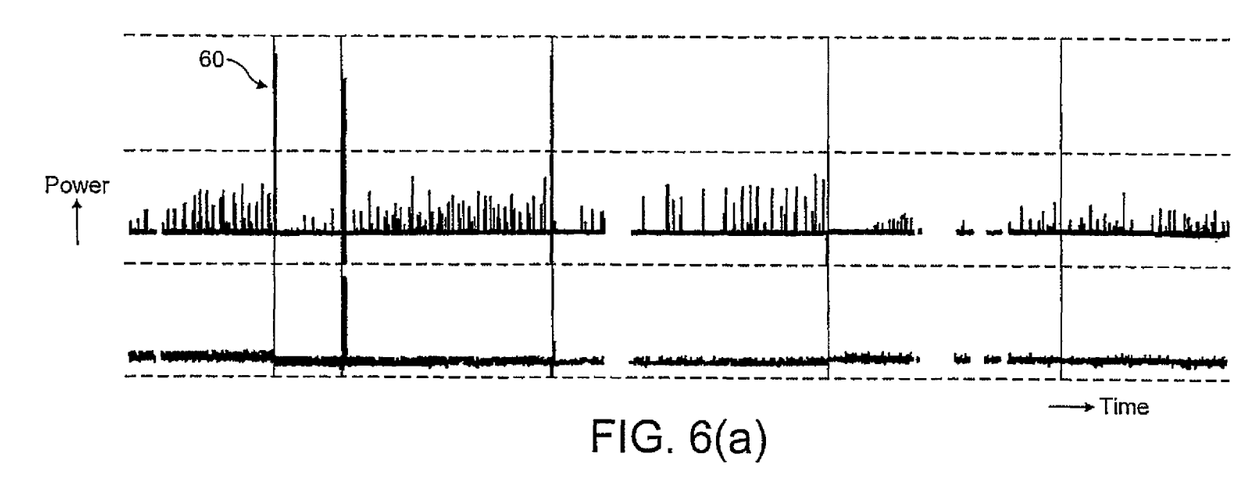
FIG. 6(a) illustrates the variation of motor power with time for two vacuum pumps used to evacuate a process chamber.

FIG. 6(a) illustrates the variation of vacuum pump motor power over a period of time, in this example a period of six months, as monitored by the controllers of two vacuum pumps used to evacuate a chemical vapour deposition chamber. As indicated at 60 in FIG. 6(a), there were a number of peaks in the variation of the motor power, which could have been indicative of a problem in the pumping mechanism, due to blockage of one of the pumps for instance. Whilst the pump controllers could have been configured to generate an alert when these peaks occurred, there was the possibility that the peaks were generated as a result of the chamber being evacuated from atmosphere, at which time the pumps would have been under a high load, and so no such alerts were generated.

Figure 6B:
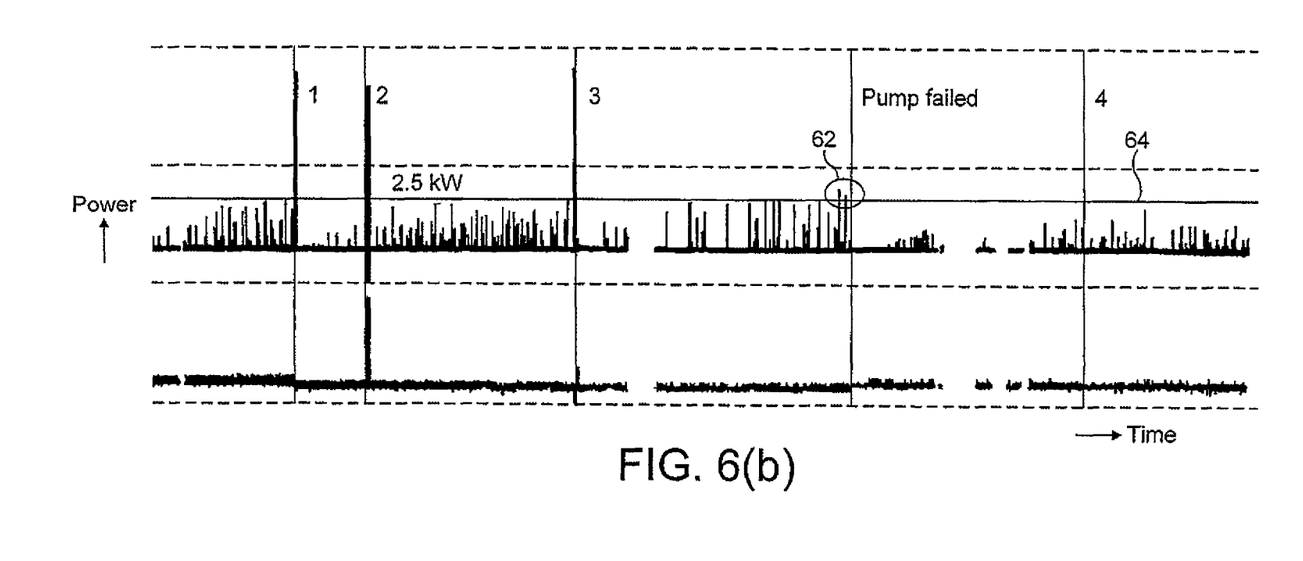
FIG. 6(b) shows the same variation as FIG. 6(a) modified to include information regarding the status of the process chamber.

FIG. 6(b) illustrates the same trace as FIG. 6(a), modified to include information regarding the status of the chamber under evacuation by the pumps. The peaks 1 to 4 represent the increased pump power drawn by the motors during "roughing", that is, when the chamber was being evacuated from atmosphere, following a routine scheduled maintenance. At the other main peak in the trace, when roughing was not taking place, one of the pumps failed due to pump blockage. This could have caused significant problems if failure had occurred during processing within the process chamber. However, if the pump had been replaced when the two peaks indicated at 62 in FIG. 6(b) had occurred, these peaks being above a predetermined value indicated at 64, for example 2.5 kW, catastrophic failure of the pump could have been avoided.

Figure 7:
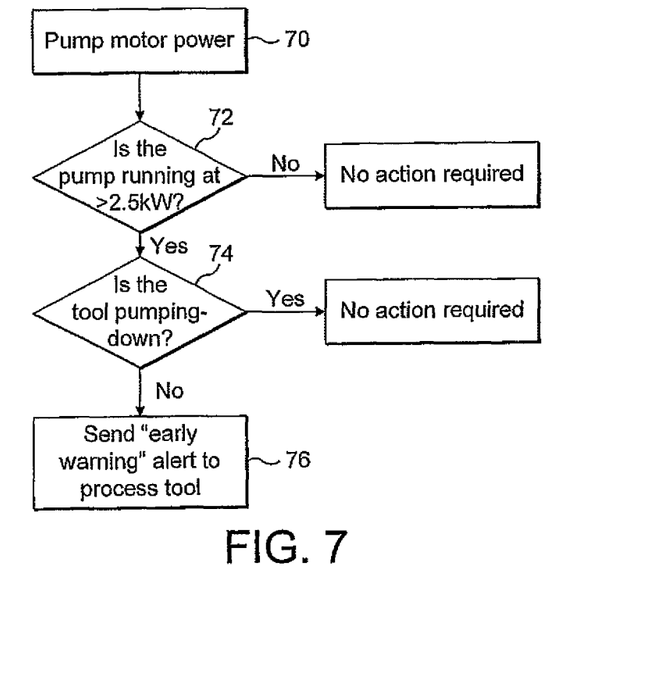
FIG. 7 is a flow chart illustrating an algorithm of a pump controller.

In view of this, FIG. 7 is a flow diagram illustrating an example of an algorithm used by the pump controller 28 to detect the onset of pump failure. At 70, the pump controller 28 monitors the pump motor power, for example by monitoring the current drawn by the motor 30 of the vacuum pump 26. The controller determines at 72, either continuously or at predetermined intervals, whether the motor power currently exceeds a predetermined value, 2.5 kW in the example shown in FIG. 7. If it is determined, at 72, that the power is below this predetermined value, then no action taken. If, however, it is determined that the power exceeds this predetermined value, then, at 74, the controller determines from the information contained within the signals received from the process tool 12 via interfaces 32, 34, whether the process chamber 14 is being evacuated from atmosphere. If it is, then no action is taken, but otherwise an alert is generated at 76.

The exact value of the predetermined value in this algorithm may be chosen in advance depending on the specific process being performed by the process tool 12. Alternatively, the pump controller 28 may contain a table of predetermined values, each stored in relation to respective process, with an appropriate value being chosen by the controller 28 in dependence on information received from the signals transmitted over the system bus 20, for example, in relation to gas flow data transmitted from the tool 12 to the host 18.

With reference to this example, whilst the height of the peaks has been selected as indicative of potential failure of the pump 26, alternatively, or additionally, the width of such peaks may have been compared with, respectively, a predetermined width at step 72. Alternatively, or additionally the frequency of the peaks may have been compared with a predetermined frequency at step 72, with, at step 74, the controller 28 determining from the received signals whether the process tool 12 was idle, with the increase in the frequency of the peaks being indicative of pump blockage.

In this example, the variation in the motor power has been chosen as the monitored operating characteristic of the pump, but operating characteristics which may have been monitored include, but are not limited to:
motor power
pump temperature
exhaust pressure
bearing vibration
as variation in any of the above operating characteristics or any combination thereof could be used to predict pump failure.

The information contained within the monitored signals and/or received signals can also be used to predict maintenance activities on the components of the evacuation system 24 based on process tool activity, rather than fixed time periods. For instance, for a given process gas mixture, it may be possible to predict (from previous experience) that the vacuum pump 26 will require replacement after X liters of process gas have flowed, and that an abatement tool 36 will require preventative maintenance after Y liters of process gas have flowed. Variability in tool utilisation can vary the number of days before which these maintenance activities are required, and so there is the risk that any scheduled maintenance could be performed too early or, more significantly, too late. Rather than scheduling these activities at certain time intervals, these activities can be timed according to how much the tool is being used.

An example is now illustrated with reference to FIG. 8 in relation to the abatement tool.

Figure 8:
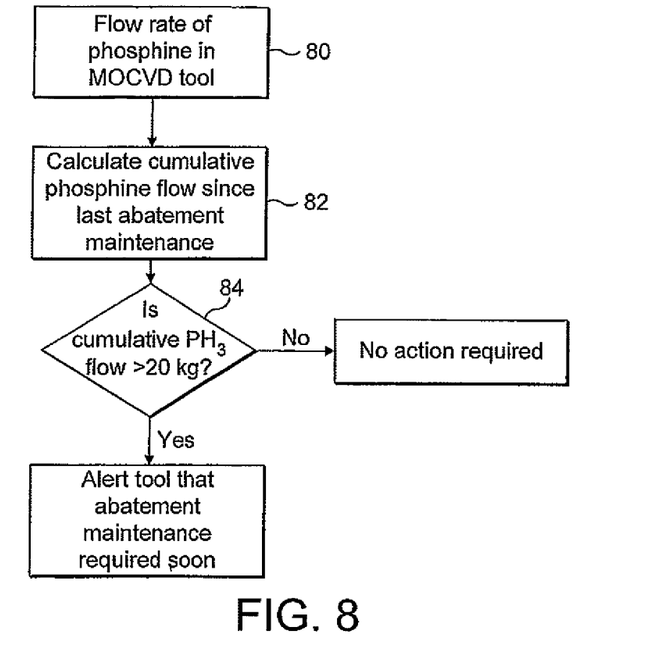
FIG. 8 is a flow chart illustrating an algorithm of an abatement tool controller.

FIG. 8 is a flow diagram illustrating an example of an algorithm used by the abatement tool controller 42 to detect when maintenance is required. In this example, the abatement tool 36 is a combustor, and the process gas contains phosphine, $PH_3$, which is typically used in MOCVD growth of InGaAlP. At 80, the abatement tool controller 42 receives, from, for example, the signals conveyed over the system bus, information regarding the current flow rate of phosphine into the process tool 12. From this information, the abatement tool controller 42 determines, at 82, the cumulative amount of phosphine that flowed into the process tool 12 since the previous maintenance of the abatement tool 36. At 84, the abatement tool controller 42 determines whether this cumulative amount exceeds a predetermined value, in this example 20 kg. If not, no action is required, but if it does, then an alert is generated to advise that maintenance of the tool is, or will shortly be, required.

The exact value of the predetermined value in this algorithm may be chosen in advance depending both on the nature of the abatement tool 36 and also on the specific process gas mixture flowing into the process tool 12. Alternatively, the abatement tool controller 42 may contain a table of predetermined values, each stored in relation to respective process gas mixtures, with an appropriate value being chosen by the controller 42 in dependence on information received from the system bus 20, for example, in relation to gas flow data transmitted from the tool 12 to the host 18.

The information received by the controllers 28, 42 from the monitored signals can also alert the controllers 28, 42 of the current and near-term status of the process tool 12. From this, utility savings may be made by allowing the evacuating system 24 to go into low-utility-consumption modes when not required by the process tool 12. For instance, if there are no wafers in a load-lock of the process chamber 14, the vacuum pump 26 and abatement tool 36 could be put into low-utility-consumption modes, and returned to a full operational mode as soon as there is activity in the load-lock (i.e. in advance of wafers being processed). For example, the time required for an abatement tool to achieve a full running state from shutdown is typically several minutes. However, taking a wafer through a load-lock, transfer chamber and into the process chamber 14 typically takes upwards of 5 minutes. Therefore if the abatement tool 36 has been put into "idle mode", it can be brought back on line using information contained in a signal passed from the process tool 12 to the host 18 when wafers are first loaded into the load-lock, and thereby be ready to treat exhaust gas before wafer processing begins in the process chamber 14.

Referring back to FIG. 1, the various interfaces of the controllers of the components of the evacuation system are also configured to transmit signals. This can enable the operational state of the process tool 12 to be controlled in dependence on the status, operating characteristics and/or requirements of the components of the evacuation system.

With reference to FIGS. 3 to 5, the interface 52 of the abatement tool controller 42 is configured to also transmit signals over the system bus 20 to the process tool 12. These signals may be received directly by the process controller 16, or may be sent to the host 18, which, in turn, issues commands to the process tool 12 using the information contained within the signals received from the evacuation system. Furthermore, both the interface 32 of the pump controller 28, and the interface 44 of the abatement tool controller 42, are configured to transmit signals back to the respective interface of the process controller 16.

Figure 9:
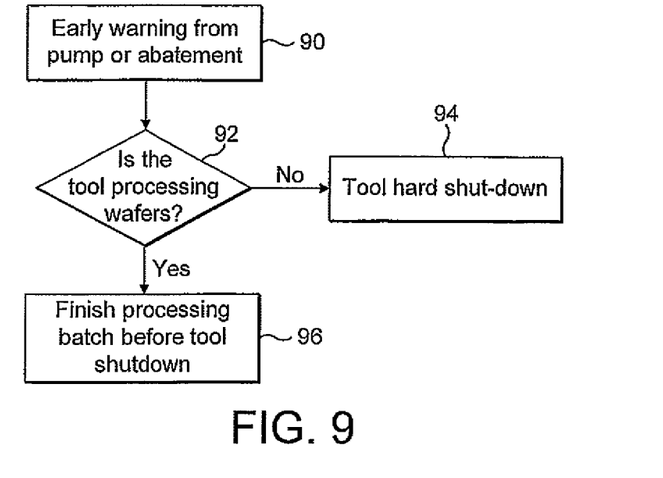
FIG. 9 is a flow chart illustrating an algorithm of a process tool controller.

By providing the process tool 12 with a current and more detailed status of the evacuation system 24, an appropriate strategy could be taken by the process controller 16 in response to the status information received over the system bus 20. FIG. 10 is a flow diagram illustrating an example of an algorithm used by the process controller 16 to detect whether a hard shutdown should be performed in response to an alert generated from a component of the evacuation system warning that the component is soon to be shutdown for replacement or maintenance. This alert may have been generated using one of the algorithms previously described with reference to FIGS. 7 and 8.

At 90, the process controller 16 receives the alert. The alert may be received directly from the vacuum pump 26 or abatement tool 36, or from the system bus 20. At 92, the process controller 16 determines whether the process tool is currently processing wafers. If not, then, at 94, a hard shutdown of the process tool 12 is performed. If it is processing wafers, then, at 96, the wafer processing is completed before the hard shutdown is performed. If the alert from the vacuum pump 26 is sufficiently serious the process controller may be programmed (based on process time remaining) to decide whether it is more cost effective the lose the currently processed wafers or risk damaging the pump.

In addition to determining whether the process tool 12 should be shutdown rapidly in response to status information received from the evacuation system, the information received from the evacuation system can enable maintenance of the process tool 12 to be synchronised with maintenance and/or replacement of a component of the evacuation system, thereby minimising overall system downtime and maximising wafer throughput.

For example, with reference to the example described in FIG. 8, if the average daily consumption of phosphine is calculated and the total quantity of phosphine consumed by the abatement tool 36 is known, then the predicted time (in days) to reach 20 kg of phosphine (i.e. time to next abatement tool maintenance) is given by the following equation:

$$\text{Time to next maintenance} = \frac{(20 \text{ kg} - \text{kg PH}_3 \text{ consumed since last maintenance})}{\text{Average daily PH}_3 \text{ consumption in kg}}$$

If this information is passed back to the process controller 16, which has its own internal calculation of when the process tool 12 will require maintenance, then the controller 16 can synchronise maintenance of the process tool 12 and the abatement tool 36. This has the potential of saving several days of system downtime per year.

It is to be understood that the foregoing represents one embodiment of the invention, others of which will no doubt occur to the skilled addressee without departing from the true scope of the invention as defined by the claims appended hereto.

For example, the controller 28 of the vacuum pump 26 may also be arranged to monitor the signals transmitted over the system bus 20. This may be effected by connecting an interface of the controller 28 to the system bus via a personal computer or the like, which monitors the signals transmitted over the system bus 20, and outputs signals to the controller 28 containing the information within the monitored signals.

As another alternative, the system bus 20 may be dispensed with, the signals output from the process controller 16 being sent directly to the pump controller 28 and the abatement tool controller 42.

The invention claimed is:

1. A method of controlling operation of a semiconductor wafer processing system; said processing system comprising a process tool having a process chamber, and an evacuation system comprising a vacuum pump arranged to evacuate the process chamber and/or an abatement tool for treating effluent stream exhaust from the process chamber, the method comprising:
    a controller of the evacuation system monitoring a system bus connected to the controller, the process tool and a host computer to detect signals transmitted from the process tool to the host computer over the system bus;
    the controller of the evacuation system utilizing information contained within the signals detected through the monitoring to generate a signal containing information for the process tool regarding an operating characteristic or status of a component of the evacuation system;
    the controller transmitting the generated signal; and
    a controller in the process tool controlling the operational state of the process tool in dependence on the generated signal by determining if it is more cost effective to lose wafers in the process tool or risk damaging the component of the evacuation system.

2. The method according to claim 1,
    wherein determining if it is more cost effective to lose wafers in the process tool or risk damaging the component of the evacuation system is based on remaining process time.

3. A semiconductor wafer processing system; said processing system comprising a process tool having a process chamber, and an evacuation system comprising a vacuum pump arranged to evacuate the process chamber and/or an abatement tool for treating effluent stream exhaust from the process chamber, the system comprising:

a controller of the evacuation system monitoring a system bus connected to the controller, the process tool and a host computer to detect signals transmitted from the process tool to the host computer over the system bus;

the controller of the evacuation system utilizing information contained within the signals detected through the monitoring to generate a signal containing information for the process tool regarding an operating characteristic or status of a component of the evacuation system;

the controller transmitting the generated signal; and a controller in the process tool controlling the operational state of the process tool in dependence on the generated signal by determining if it is more cost effective to lose wafers in the process tool or risk damaging the component of the evacuation system .

4. The system according to claim 3, wherein determining if it is more cost effective to lose wafers in the process tool or risk damaging the component of the evacuation system is based on remaining process time.

* * * * *